United States Patent Office 3,557,647
Patented Jan. 26, 1971

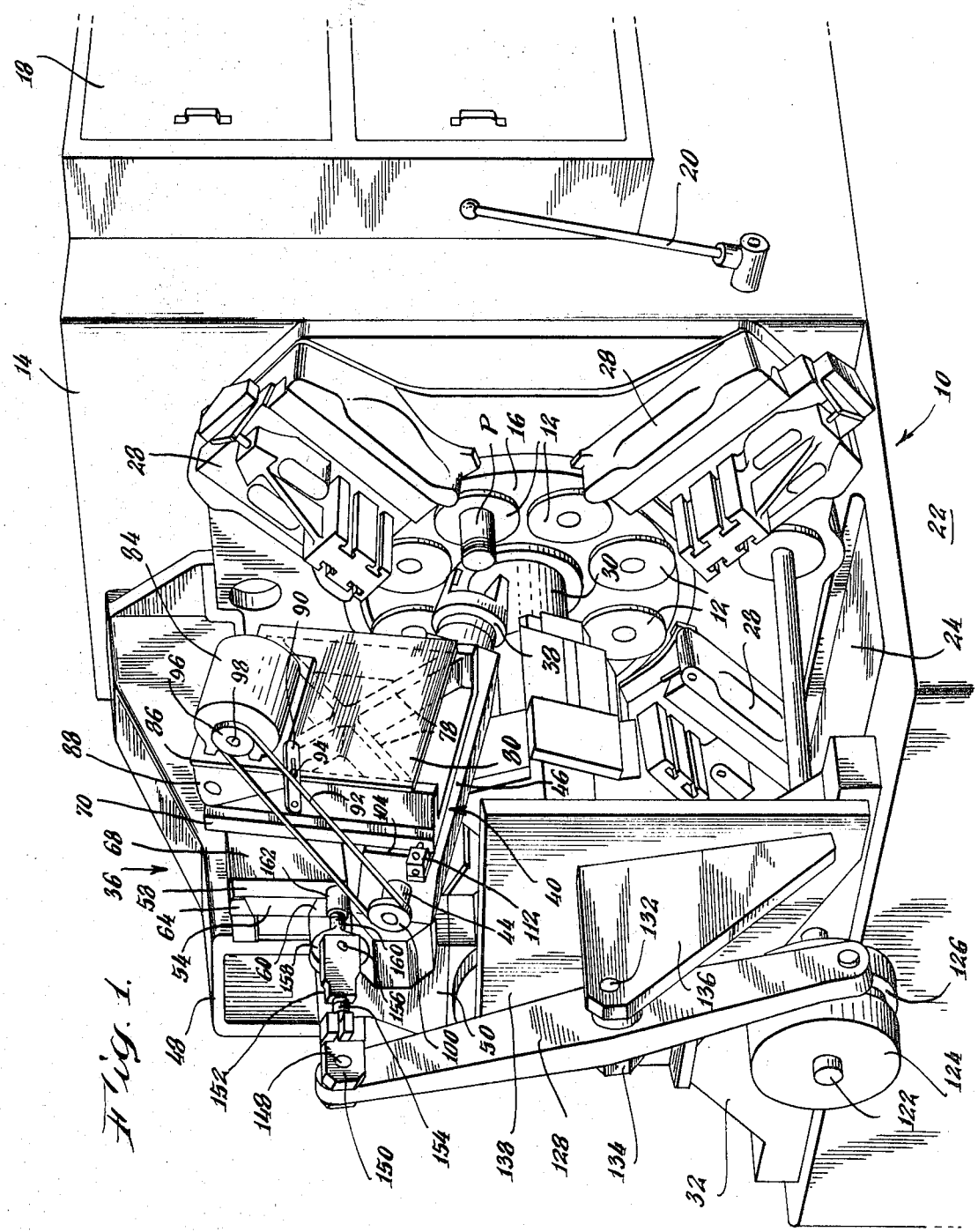

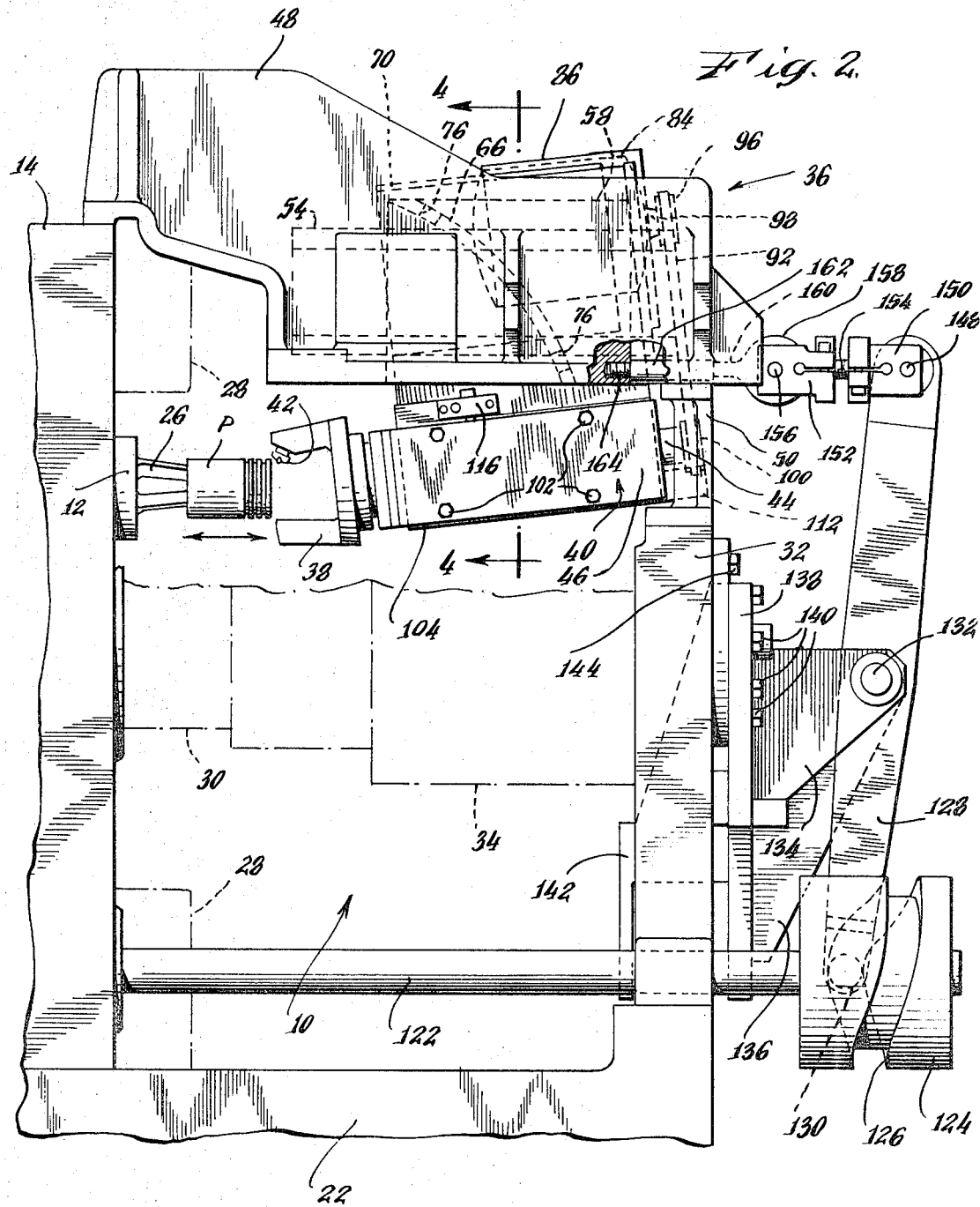

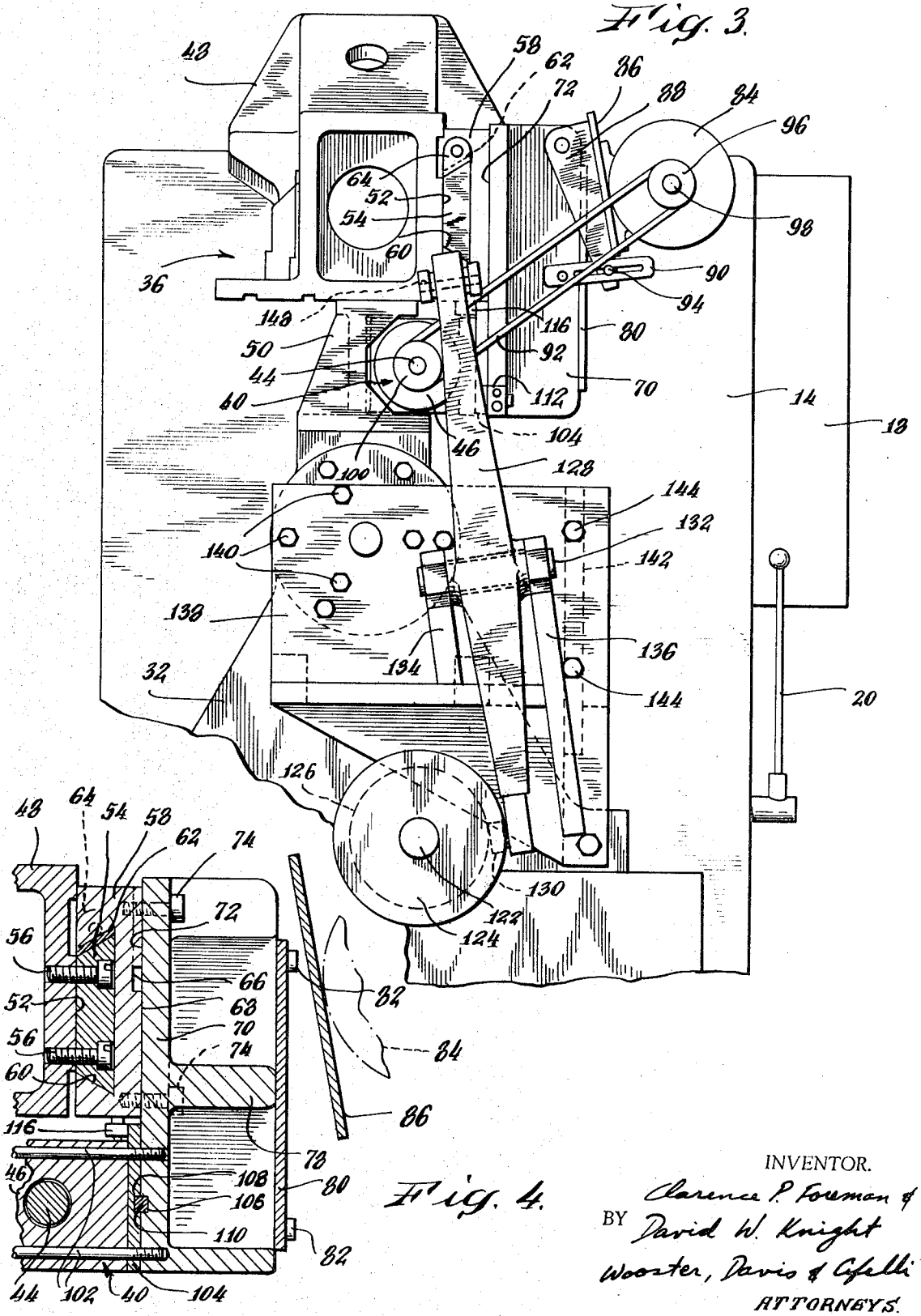

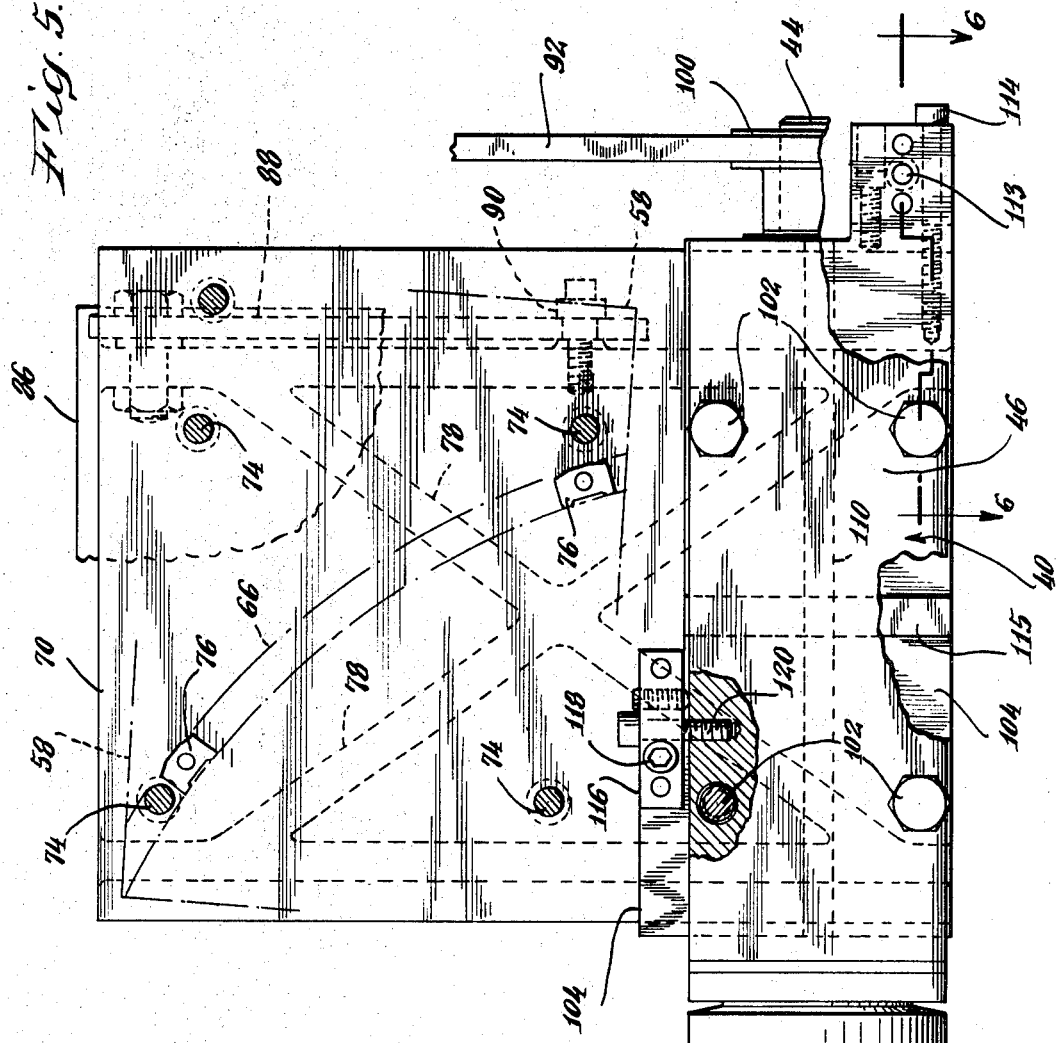

3,557,647
AUXILIARY APPARATUS FOR ELLIPTICAL TURNING OF A WORKPIECE ON A MULTIPLE SPINDLE CHUCKING MACHINE
Clarence P. Foreman, Trumbull, and David W. Knight, Stratford, Conn., assignors to The U.S. Baird Corporation, Stratford, Conn., a corporation of Connecticut
Filed Apr. 26, 1968, Ser. No. 724,328
Int. Cl. B23b *3/34*
U.S. Cl. 82—3         5 Claims

ABSTRACT OF THE DISCLOSURE

A multiple spindle chucking machine having plural indexable workpiece holding spindles, longitudinal tool slides, cross tool slides and carrying an auxiliary apparatus having an overhead support bracket carrying a longitudinal tool slide from which a motor, a high speed spindle and cutting tool are suspended for longitudinal reciprocation to turn an elliptical surface on a workpiece at one indexed position.

BACKGROUND OF THE INVENTION

This invention relates to an auxiliary apparatus for turning elliptical surfaces on a workpiece and more particularly for generating such surfaces on a workpiece as one of a sequence of machining operations performed on a multiple spindle chucking machine.

When producing long-run parts it is desirable to perform as many operations as possible on a single machine. A high production item such as a piston for internal combustion engines may have as many as four machining operations performed thereon, for example, turning the skirt, cutting the ring grooves, chamfering the ring grooves and facing the piston. Modern pistons also require the turning of an elliptical surface on their skirts to compensate for distortion in operation at high temperatures, pressures and speeds. It would be highly desirable to perform all these operations, including ellipse turning, on a single multiple spindle chucker.

Heretofore, the semi-finished piston had to be removed from a multiple operation machine in order to turn the elliptical skirt on a separate machine especially designed for this operation. It should be apparent that this is extremely expensive in terms of "down" time during which the workpiece is idle. The prior art elliptical turning machines usually include a longitudinal movable work holding table and an immovable tool and motor support, both mounted upon a massive bed. Since an ellipse is a projection of a tipped circle, the elliptical shape on the skirt of the workpiece is achieved by positioning the axis of rotation of the cutting tool at a slight angle with respect to the axis of the piston. The cutting tool, which is received in a cup shaped tool holder, is rotated at a high speed by a supported motor and the workpiece is advanced into the cup shaped tool holder as its outer surface is being turned.

Ellipse turning of a workpiece has been attempted on multiple spindle chuckers by moving a suitable cutting tool by means of a cam as the workpiece rotates. This method has been unsuccessful because of chips which fouled the cams. Furthermore, this method could only be performed at approximately 650 r.p.m. which is considerably slower than the other machining operations which are performed on the multiple spindle chucker.

Accordingly, it is the primary object of our invention to provide an auxiliary apparatus for ellipse turning which may be mounted upon the usual multiple spindle chucker to perform this machining operation as one of a sequence on an indexable workpiece.

Another object is to provide an auxiliary apparatus for ellipse turning on a multiple spindle chucker which may be performed at approximately the same speed as the other machining operations.

Still another object is to provide an auxiliary apparatus for ellipse turning on a multiple spindle chucker in which the cutting tool is advanced toward and over a stationary workpiece.

To accomplish these objects in one form, we have provided an auxiliary apparatus for use with a multiple spindle chucker which apparatus includes an overhead support bracket positionable upon the chucking machine, a longitudinally reciprocable and rotatable cutting tool, means for rotating the tool, means for suspending both the tool and the rotating means from the support bracket with the axis of tool rotation being angularly disposed relative to the axis of reciprocation of the tool, and means for reciprocating the tool over the workpiece for turning an elliptical surface thereon.

BRIEF DESCRIPTION OF THE DRAWINGS

Other objects and further details of that which we believe to be our invention will become clear from the following description and claims taken with the accompanying drawings wherein:

FIG. 1 is a perspective view of the auxiliary apparatus for ellipse turning shown mounted upon a usual multiple spindle chucking machine;

FIG. 2 is a side elevational view of our auxiliary apparatus showing the cutter head and driving spindle suspended from the overhead slide and the slide reciprocating linkage;

FIG. 3 is an end elevational view of our auxiliary apparatus showing the means by which the cutter head is mounted for longitudinal reciprocation;

FIG. 4 is a sectional view taken substantially along line 4—4 of FIG. 2;

FIG. 5 is an elevational view showing the means for accurate mounting of the cutter head and driving spindle relative to the workpiece, but is not a true side elevational view, as the parts are slightly rotated in a clockwise direction relative to the true side elevational view shown in FIG. 2; and FIG. 6 is a sectional view taken substantially along line 6—6 of FIG. 5 showing the location of the end adjustment block.

DESCRIPTION OF THE PREFERRED EMBODIMENT

Turning now to the drawings, there is illustrated a usual multiple spindle chucking machine 10 having eight indexable work holding spindles 12 upon which a workpiece P in the form of a piston is shown in the two o'clock position (note FIG. 1). A drive housing 14 encloses the main gear transmission which drives a spindle carrier 16, a chuck operating mechanism and the machining tools through suitable mechanical linkages. A control panel 18 and a starting lever 20 are visible at the exterior of the housing. The bed 22 underlying the machining stations is provided with a trough 24 within which chips and lubricating fluids may be caught.

The spindle carrier 16 which extends from the housing 14 may be indexed in precise increments and is locked in position at each station to insure accurate positioning of the work-holding spindles 12. To hold the work at each station the spindles 12 carry various types of holding fixtures, such as an expanding type gripper 26 as schematically illustrated in FIG. 2. Secured to the face of the housing 14 are the cross slides 28 which furnish mounting for tools to perform such operations as facing, grooving and chamfering. A massive center bar 30 extends through the spindle carrier 16 on the housing wall, its opposite end being supported by the heavy duty end bracket 32

Arranged around the center bar 30 are individual longitudinal slides which provide mounting for longitudinally movable tools.

Our auxiliary apparatus generally designated by the numeral 36 is shown in FIG. 1 as being mounted over the center bar 30 and suspending a longitudinally movable rotatable cutter head 38. While some prior art elliptical turning machines maintain the cutter head stationary and move the workpiece longitudinally, this would be impossible on a multiple spindle chucker, wherein the workholding spindles 12 which angularly index the workpiece from station-to-station only allow the workpiece to be held stationary or rotated in place, we have devised a heavy duty construction to enable the cutter head 38 and its associated driving spindle 40 to be moved longitudinally. Spindle 40 is an assembly comprising spindle body 46, spaced supporting bearings (not shown) positioned within the body, and a rotatable spindle shaft 44 mounted in the bearings. Moreover, in order to satisfy the objects of our invention it is necessary to provide means to perform the ellipse cutting operation at substantially the same speed as the other machining operations—viz. approximately 1700 r.p.m.

Referring now to FIG. 2 the workpiece P may be clearly seen relative to the cutter head 38 of our auxiliary apparatus. A cutting tool insert 42 is positioned in the cutter head 38 which is U-shaped, balanced and rotates on an axis angularly disposed relative to the axis of the workpiece and reciprocates longitudinally in a direction parallel to the axis of the workpiece. In this manner, the cutter head "swallows" the workpiece as the cutting tool 42 is advanced over the surface thereof taking a semi-finish cut. The cutter head which is relatively heavy to allow the tool 42 to maintain a smooth cut on the workpiece is driven by a large motor driven spindle shaft 44 precision mounted on bearings secured in a driving spindle 40 to dynamically balance the cutter head at the high operating speed of 1700 r.p.m. Accuracy of machining, which is of primary concern, necessitates the absence of any imbalance or vibrations in the cutter head.

To this end, we have provided a massive overhead casting 48 capable of supporting the cutter head 38, the driving spindle 40 and its slide mounting 54, 58 and damping vibrations in the apparatus. One end of the casting is supported on the drive housing 14 and the other end is supported upon an overhead casting support 50 mounted atop the heavy-duty end bracket 32. The right side wall 52 of the overhead casting (as viewed in FIG. 3) is finish machined to receive a dovetail slideway 54 which is mounted thereon by means of a plurality of securing screws 56 (FIG. 4). A slide 58 defines a dovetail recess 60 which is larger than the slideway 54 so that it may receive a hardened tapered gib 62 which forms a replaceable wear plate. The gib is insertable between the upper portion of the slideway 54 and slide 58 where the wear problem is greatest and is maintained in position by a suitable securing plate 64 which may be bolted on the slide as shown. An arcuate keyway 66 (shown in dotted lines in FIG. 2) may be milled in the finished machined planar wall 68 of the slide.

A cast spindle mounting plate 70 having a finish machined planar surface 72 is angularly mounted upon the slide 58 with suitable securing screws 74. Accurate positioning of the spindle mounting plate relative to the slide is further provided by means of spaced keys 76 on the mounting plate which are insertable in the keyway 66 (note FIGS. 2 and 5). The mounting plate 70 is cast with cross bracing reinforcing ribs 78 which can be clearly seen in dotted lines in FIGS. 1 and 5. A cover plate 80 secured to the ribs 78 by securing screws 82 rigidifies the mounting plate and prevents entry of foreign objects into the open area defined by the ribs. We have provided this extremely rigid mounting plate in order to support a pivotally secured driving motor 84 thereto and to damp vibrations generated by the motor. A mounting plate 86 to which the motor 84 is secured is pivotally mounted on the spindle mounting plate by means of a pivot bracket 88 selectively angularly positionable with a tensioning bracket 90 which enables a motor drive belt 92 to be properly tensioned and may be secured in a selected angular position by means of a tightening bolt 94. The motor drive belt is mounted over a motor sheave 96 disposed on a motor shaft 98 and a spindle sheave 100 disposed on the spindle shaft 44 to drive the cutter head 38. A protective shield (not shown) is usually positioned over the belt 92.

The spindle body 46 is mounted on the angularly disposed spindle mounting plate 70 by means of elongated securing screws 102 and is separated therefrom by an accurately machined spacer 104 which must be precision ground to insure proper axial alignment of the cutter head 38 with the workpiece P. The aligned mounting holes defined through the spindle body 46 and the spacer 104 for passage of the securing screws 102 are formed with sufficient clearance to allow for slight "horizontal" and "vertical" adjustment in the positioning of the spindle 40. The adjusting means can best be seen in FIGS. 4, 5, and 6 and include "horizontal" keyways 106 and 108 milled in the spindle mounting plate 70 and the spacer 104 which cooperate to receive a common "horizontal" key 110. An end adjustment block 112 is secured to the spacer with screw 113 and includes an adjusting screw 114 which allows the spacer to be accurately "horizontally" located relative to the spindle mounting plate (FIG. 6). Similarly, a "vertical" key 115 is positioned between the spacer 104 and the driving spindle 40 and an upper adjustment block 116 is secured to the spacer with screw 118, adjustment of the driving spindle relative to the spacer being accomplished by means of the adjusting screw 120. In this manner we have insured the square positioning of the driving spindle by the adjustments in two planes.

In order to propel the cutter head 38 in a path parallel to the axis of the workpiece P we have provided a drive linkage including a constant speed cam shaft 122 extending outwardly from the drive housing 14, over the bed 22 and through the heavy-duty end bracket 32. At its end, the shaft 122 carries a massive box cam 124 having a groove 126 which provides a fool-proof, easily maintained, positive drive.

A drive lever 128 carrying a cam follower roller 130 at its lower end is pivotally mounted at its center on a pivot pin 132 whose ends are supported by the outwardly extending arms 134, 136 of the end plate weldment 138 which is secured to the heavy end bracket 32 by the bolts 140. A bracing weldment 142 secured to the opposite surface of the end plate weldment 138 by bolts 144 and to the opposite surface of the heavy end bracket 32 further rigidly supports the drive lever 128. At the opposite end of the drive lever 128 we have provided an opening to receive a clevis pin 148 to which a first clevis 150 may be secured. A second clevis 152 is secured to the first by an adjusting screw connector 154 which allows the stroke to be varied. A second clevis pin 156 secures the second clevis 152 to a wrist pin 158 which has a threaded shank 160 for threaded engagement in one end of a stud 162. The stud 162 has a threaded end securable in a tapped opening 164 formed in the slide 58. In this manner the rotation of the constant speed cam shaft 122 is translated to a horizontal reciprocation of the slide 58.

Our novel auxiliary apparatus allows us to adjust the amount of the ellipse by changing the angular relationship between the workpiece P and the cutter head 38. This may be accomplished by shifting the already angularly mounted spindle mounting plate 70 to a greater or lesser angular position relative to the slide 58 on which it is mounted. This requires the drilling of new mounting holes which receive the securing screws 74. However, when the spindle mounting plate is shifted the keys 76 positioned upon the spindle mounting plate 70 must still enter the arcuate keyway 66 in the slide 58. Then the upper adjustment block 112 and the end adjustment block 114 must be relocated to properly align the cutter head 38 with the workpiece P.

It should be noted that although the slideway 54 and slide 58 support the weight of the heavy suspended structure along their upper interface on the tapered gib 62 there is no appreciable binding between these members due to the weight distribution of the suspended structure. The counterclockwise force moment of the spindle 40 and cutter head 38 substantially balances the clockwise force moment of the motor 84 and the spindle mounting plate 70, the resultant load on the interface being thereby substantially reduced. In this manner the suspended weight does not appreciably interfere with the advancement and retraction of the slide 58 on the slideway 54.

Having described our invention of an auxiliary apparatus for ellipse turning to be used with a multiple spindle chucker it should be readily appreciated by those skilled in this art that we have provided such an apparatus which is uniquely constructed to conserve space and to allow the multiple spindle chucker to be an even more versatile machine. We have constructed this apparatus with a view to performing the ellipse turning operation at substantially the same speed as the other machining operations in order to reduce idle time between operations. This has necessitated the construction of a massive overhead supporting structure which insures dynamic balancing of the heavy cutter head, for accurate machining.

It should be understood that the present disclosure has been made only by way of example and that numerous changes in details of construction and the combination and arrangement of parts may be resorted to without departing from the true spirit and scope of the invention as hereinafter claimed.

What is claimed is:

1. For use with a multiple spindle chucking machine having plural selectively indexable work holding spindles, an auxiliary apparatus for turning elliptical outer surfaces on a workpiece at one of the indexed spindle locations comprising: support means arranged to be positioned upon the chucking machine; a longitudinally reciprocable and rotatable cutting tool; means for rotating said cutting tool; means for suspending both said cutting tool and said rotating means from said support means with the axis of rotation of said cutting tool being angularly disposed relative to the axis of reciprocation of said cutting tool; and means for reciprocating said cutting tool over the workpiece whereby an elliptical surface may be turned thereon; said suspending means comprising a slideway firmly secured to said support means, a slide mounted for reciprocation on said slideway, and a mounting plate secured to said slide which carries both said cutting tool and said rotating means; said rotating means including a drive motor, a drive shaft, and motion transmission means connecting said drive motor and drive shaft, said drive motor being suspended on one side of a vertical plane defined through the longitudinal center line of said slide and said slideway, and said drive shaft and cutting tool being suspended on the other side of the vertical plane, whereby the force moment of said motor counteracts the force moment of said drive shaft and said cutting tool.

2. For use with a multiple spindle chucking machine having plural selectively indexable work holding spindles, an auxiliary apparatus for turning elliptical outer surfaces on a workpiece at one of the indexed spindle locations comprising: support means arranged to be positioned upon the chucking machine; a longitudinally reciprocable and rotatable cutting tool; means for rotating said cutting tool; means for suspending both said cutting tool and said rotating means from said support means with the axis of rotation of said cutting tool being angularly disposed relative to the axis of reciprocation of said cutting tool; and means for reciprocating said cutting tool over the workpiece whereby an elliptical surface may be turned thereon; said suspending means including a slideway secured to said support means, a slide mounted for reciprocation on said slideway, a mounting plate secured to said slide which carries both said cutting tool and said rotating means, said mounting plate being angularly disposed relative to said slide for carrying said cutting tool with its axis of rotation angularly disposed relative to its axis of reciprocation, and further including angular locating means comprising an arcuate groove defined in one face of said slide and key members secured to said mounting plate arranged to enter said groove, said groove and said key members cooperating to define an arcurate path in which said mounting plate may be moved.

3. For use with a multiple spindle chucking machine having plural selectively indexable work holding spindles, an auxiliary apparatus for turning elliptical outer surfaces on a workpiece at one of the indexed spindle locations comprising: support means arranged to be positioned upon the chucking machine; a longitudinally reciprocable and rotatable cutting tool; means for rotating said cutting tool; means for suspending both said cutting tool and said rotating means from said support means with the axis of rotation of said cutting tool being angularly disposed relative to the axis of reciprocation of said cutting tool; and means for reciprocating said cutting tool over the workpiece whereby an elliptical surface may be turned thereon; said suspending means comprising a slideway secured to said support means, a slide mounted for reciprocation on said slideway, and a mounting plate secured to said slide which carries said cutting tool and said rotating means; said rotating means including a drive motor, a drive shaft, motion transmission means connecting said drive motor and said drive shaft, and squaring means for accurately adjusting the location of said drive shaft relative to said mounting plate along a first line parallel to the axis of said drive shaft and along a second line transverse to the axis of said drive shaft.

4. For use in combination with a multiple spindle chucking machine including a bed, a motor housing, a selectively indexable spindle carrier, a plurality of spaced workpiece carrying spindles mounted on said spindle carrier, a plurality of cross slide tool carriers, a plurality of longitudinal slide tool carriers, and a constant speed cam shaft which has a cam secured at one end thereof, an auxiliary apparatus for turning elliptical outer surfaces on a workpiece at one end of the indexed spindle locations comprising: a support means arranged to be positioned upon the chucking machine; a longitudinally reciprocable and rotatable cutting tool; means for rotating said cutting tool; means for suspending both said cutting tool and said rotating means from said support means with the axis of rotation of said cutting tool being angularly disposed relative to the axis of reciprocation of said cutting tool; and means for reciprocating said cutting tool over the workpiece whereby an elliptical surface may be turned thereon; said suspending means comprising a slideway firmly secured to said support means and a slide mounted for reciprocation on said slideway; and said reciprocating means comprising a centrally pivoted oscillating lever having one end secured to said slide and the other end secured to and moved by said cam.

5. The combination defined in claim 4 wherein an adjustable linkage means is provided to secure said one end of said lever to said slide for varying the length of travel of said slide.

References Cited

UNITED STATES PATENTS

| 2,082,516 | 6/1937 | Rupple | 29—57 |
| 2,720,806 | 10/1955 | Stewart | 82—18X |
| 2,919,615 | 6/1960 | Brown | 29—57X |

LEONIDAS VLACHOS, Primary Examiner

U.S. Cl. X.R

82—18; 29—57